United States Patent Office 3,519,433
Patented July 7, 1970

3,519,433
METHOD OF HANDLING ANIMALS
William O. Reece, Oak Lawn, Ill., assignor to Swift & Company, Chicago, Ill., a corporation of Illinois
No Drawing. Filed July 19, 1960, Ser. No. 43,743
Int. Cl. A22b 3/00; A23l 1/31
U.S. Cl. 99—107
11 Claims

ABSTRACT OF THE DISCLOSURE

A method of slaughtering animals is disclosed whereby the animals are injected with a skeletal muscle relaxant in an amount sufficient to substantially inhibit the voluntary and reflex movement of the muscles prior to dispatch. The animals may be injected with a proteolytic enzyme solution and rendered unconscious prior to bleeding.

This invention relates in general to the handling of animals in slaughtering operations. More particularly, my invention is directed to an improved method for restraining animals prior to dispatching the animals.

In most livestock slaughtering establishments the animals are held for varying periods of time in holding pens often located a substantial distance from the dispatching station. In moving the animals from the pens to the dispatching station, which is often in a building several floors above ground level, the animals are driven along ramps, around corners and into crowded enclosures prior to their being bled. In the course of this procedure, electrical or other prodding is often employed to keep the animals moving. This prodding excites the animals and tends to cause blood pressure rise and bruising of the animals as they bump one another or the walls along their path of movement. Gentler handling of the animals from the pens to the dressing floor precludes planning a steady flow of livestock and thus makes the slaughtering operation less efficient.

Aside from the above considerations, it has become increasingly necessary to provide mechanical or physical restraint of the living animals at some point during their movement to the killing floor. When concussion or penetration stunning is used to insensibilize an animal prior to bleeding the animal, the animal is usually mechanically restrained in some manner so that the operator can properly place the blow. With the advent of electrical stunning as a humane method of dispatching animals, it has been found necessary to restrain each animal to facilitate proper placement of the electrodes on the head. The use of a restraint chute, while providing certain advantages, nevertheless necessitates stopping a moving line of hogs for the period during which the restrained animal is being stunned. This stopping creates the problem of not being able to maintain a steady flow of hogs at the restraint chute unless some means such as electrical stimulation is utilized. The raising of the animal's blood pressure, as a result of driving, electrical prodding, and mechanical pressure of restraint, tends to increase the incidence of hemorrhage which sometimes follows electrical stunning.

Experience with electrically stunned cattle indicates that considerable violence attends the regaining of consciousness following stunning. Physical restraint is, therefore required before and after stunning to avoid injury to the animal and possible injury to personnel. Cattle may regain consciousness in a minute or less after electrical stunning. The problems attendant electrical stunning of cattle would be overcome, at least in part, if the cattle could be bled immediately after stunning. However, the physical layouts in most slaughtering plants are not usually adaptable to this sequence in the time available, and in many cases electrical stunning of cattle has been abandoned. Work in the area of electrically stunning sheep and calves also indicates that physical restraint of the animal is necessary for proper placement of the electrodes. In the case of sheep it appears that it may be necessary to manually place each sheep into the restraint chute. The impracticability of such a system is apparent. With calves it is anticipated that physiological problems similar to those encountered with hogs as an incident to driving would be present.

The necessity for physical restraint of live meat-bearing animals, just discussed, causes increased equipment requirements with attendant increase in labor and time requirements, all of which tend toward less than maximum economic efficiency of the slaughtering operation.

Immobilization of animals by means of asphyxiants such as carbon dioxide gas has been carried out. The action of such gases is to immobilize only after sufficient asphyxia has taken place to insensibilize the animal. Prior to insensibilization, the animal thrashes about as it attempts to breathe. The movement makes physical restraint necessary. In addition, if the animal is removed from the asphyxiant atmosphere before asphyxia is irreversible, i.e., results in complete respiratory failure and death, it will revive in a relatively short period of time, often less than a minute, again providing a time problem prior to bleeding with which may slaughtering plants are not equipped to deal.

Another area that now usually requires mechanical restraint of live animals is that involving ante-mortem injection of proteolytic enzymes into the animal. A method of improving the tenderness of meat by this means is disclosed and claimed in U.S. Pat. No. 2,903,362, Beuk et al., issued Sept. 8, 1959. Attention is also directed to U.S. patent application Ser. No. 749,073, filed July 17, 1958, by John M. Hogan. In most plants the enzyme injection procedure, therefore, requires additional space on or near the dressing floor because the regular line of incoming animals is not adaptable to this process. Many plants are thus not suited to this method unless major structural changes are provided. U.S. patent application of William O. Reece, Ser. No. 43,744, filed July 19, 1960, discloses and claims a system whereby animals are stunned or otherwise rendered unconscious (i.e. insensible) prior to enzyme injection. While this system is a definite advance, the instant invention, as explained hereafter, provides a method for substantially overcoming any drawbacks which may arise therein.

Direct heart bleeding of animals would be desirable in some instances. A major objection to this method of substantially draining the blood from the circulatory system of animals has been the usual methods of effecting insensibility do not produce complete immobility (for example, reflex actions and agonal contractions during bleeding occur even in stunned or anesthetized animals) and thus the heart needle and cannula are often displaced after insertion into the heart.

It is a principal object of my invention to provide a method of handling an animal in a slaughtering operation in such a manner as to present, for further processing, an immobilized animal incapable of self-inflicted damage and requiring minimal restraint or labor.

An additional object of my invention is to provide a means of handling animals whereby there is less bruising of the animals.

A further object of my invention is to provide a method whereby prodding of animals to move them to the dressing floor may be eliminated, if desired, thereby substantially eliminating excitement of the animal from that source, with its attendant disadvantages.

Another principal object of my invention is to provide a method whereby a steady flow of animals can be planned to the bleeding station, or zone, regardless of the number and type of operations that are to be performed on the animals prior to reaching that station.

My invention also includes, as an object thereof, the substantial elimination of much or all mechanical restraining equipment. For example, animals need no longer be restrained in various apparatus while being stunned, or prior to and during enzyme or other injection. This aspect of the invention permits a substantial decrease in equipment and labor costs and reduction in time of processing from holding pen through bleeding station.

An additional object of the invention is to provide an improved method of handling animals for slaughter prior to rendering them unconscious.

Another object of the invention is to substantially eliminate the blood pressure rise resulting from driving of the animals and/or electrically prodding the animals and/or from the mechanical pressure of physical restraint. As a result of the substantial elimination of blood pressure rise, the incidence of hemorrhage following electrical stunning, if carried out, is reduced.

Still another object of my invention is to provide a method which will present a substantially completely relaxed animal. This method allows time for carrying out other operations on the animal, if desired, substantially reduces or eliminates any undesirable physiological changes in animals following conventional handling, and can lengthen the time after stunning before which the animal must be bled.

The method of my invention allows for integration into the in-line dispatching layout of a slaughterhouse of an enzyme injection procedure, heart bleeding, stunning, or any other procedure normally necessitating mechanical or physical restraint of a live animal.

By practicing my method an animal is immobilized in a manner which makes possible the use of the conveyor system in slaughtering operations. It is, therefore, feasible to inject enzyme, stun, etc., if desired, at substantially any desired distance away from the dressing floor. This system can be adapted to operate substantially continuously.

An additional object of the invention is to make feasible the electrical stunning of cattle. My method substantially overcomes the violence attendant the animal regaining consciousness and thus provides the time necessary after electrical stunning of cattle to bleed the animal. My method also removes the difficulties associated with electrically stunning sheep and calves and makes these procedures feasible.

My method is also adaptable for use as an adjunct to immobilization with asphyxiants, substantially eliminating the violence attending asphyxiation and thus making feasible the use of asphyxiants, such as carbon dioxide, on cattle.

Further objects and advantages if not specifically set forth herein, will become apparent to those skilled in the art from the following description of my invention.

I have discovered that an improvement in handling an animal prior to bleeding thereof is obtained if a small amount of a muscle relaxant drug is first administered to the animal.

Administration of the muscle relaxant drug can be accomplished by any one of several routes, for example parenteral injection, local absorption, and inhalation in certain instances. Certain of the drugs are also effective when administered orally. The dosage should be sufficient to cause substantially complete inhibition of voluntary movement by the animal and substantial loss of reflex activity of the skeletal muscles. Preferably I administer sufficient of the drug to cause this amount of immobility in 15 minutes or less. With the preferred dosage the animal will remain immobile for at least 3–5 and usually 10–20 minutes, thus allowing ample time for carrying out any desired operations prior to bleeding (and including bleeding if desired). Lesser amounts of the drug can be used if added time to cause immobility and/ or a shortened period of immobility are not disadvantageous in the particular system under which you are operating. Larger dosages can be used. While it is possible to cause irreversible respiratory paralysis (i.e. stoppage of breathing, resulting ultimately in anoxia of the heart muscle and death) with sufficiently large doses of the muscle relaxant drug, or repeated sublethal doses, this is not necessarily a drawback and, in fact, provides an improved method for insensibilizing the animal (i.e. rendering the animal unconscious) prior to bleeding. The animal immobilized with a muscle relaxant drug can be shackled and bled or bled in a horizontal position prior to recovering from the effect of the drug. Heart action is not impaired when sublethal doses of the drug are used. If a lethal dose is administered, heart action will remain relatively steady and moderate to strong until shortly before death occurs. My method provides humane treatment of the animal and, in addition, provides a substantially completely relaxed animal free from the physiological problems, such as, for example, blood pressure rise and excessive hemorrhage, which can accompany other modes of insensibilizing livestock, notably electrical stunning.

Effective drug dosage will vary with the species of animal, the drug used, and the method of administration thereof, as well as with the predetermined minimum time in which it is desired to cause immobility and the duration of immobility desired. As a general rule an intraperitoneal or intramuscular injection of the drug will require about ten times the amount of the material as an intravenous injection. This does not necessarily indicate that intravenous injection is preferred because certain of the muscle relaxants are so readily metabolized that intravenous injection, while perhaps more rapidly immobilizing, may in the case of some drugs allow such rapid breakdown of the drug and/or excretion that an undesirably short period of time during which the animal is immobilized may result. With my preferred drug, it appears that cattle and calves require the least amount of the muscle relaxant drug, perhaps about one-half the effective dosage for sheep. Hogs require a larger dose of the preferred drug than sheep, preferably up to about twice as much. When employing intramuscular, intraperitoneal or subcutaneous injection, lesser amounts of the drug (up to one-half the usual dosage) may be used if a spreader, such as hyaluronidase, is employed with the drug. However, again it should be recognized that faster absorption may allow faster metabolism of the drug with attendant shortening of the immobility period. Other materials, such as analgesics, hypnotics, sedatives, anesthetics, tranquilizers, etc., can also be employed with the muscle relaxant for their effect.

The chemical immobilization contemplated can be accomplished by any drug that will effect substantial paralysis of the skeletal muscles of the animals. Such drugs immobilize by producing a blockage of nervous transmission at the myoneural junction. As mentioned previously, it is permissible to administer a lethal dose, inasmuch as death usually occurs relatively slowly and with substantially no regaining of movement or agonal struggling. When an animal is given a lethal dose, it will first exhibit the muscle relaxation seen in sublethal doses (i.e. the animal will appear drowsy, his legs will "fold up" and he will go down in sternal recumbency), then a loss of tonus in the neck muscles will be noted, followed by shallow breathing, loss of palpebral reflex, and ultimately death.

Examples of muscle relaxants that are suitable for use in my method include, but are not limited to, curarine, tubocurarine chloride, succinylcholine dichloride, succinylcholine diiodide, succinylcholine dibromide, mephenesin, gallamine triethiodide, and decamethonium bromide. The succinylcholine halides are preferred inasmuch as they are rapidly hydrolyzed into two non-toxic compounds—succinic acid and choline—within the animal tissues. This breakdown is the result of action by a natural tissue enzyme. Hydrolysis would be complete under the conditions of this use, and substantially no residue of the drug would be carired over in the meat. Since succinylcholine is substantially ineffective orally, being rapidly hydrolyzed in the digestive tract and other tissues, any residue which might remain in the meat presents no hazard to the consumer.

The following are the effective minimum dosages of succinylcholine dichloride that I have found will cause immobilization in 15 minutes or less, the effect of which will last for at least 3 minutes. These dosages are preferably administered by way of aqueous solution of the drug. With intravenous injection I prefer to use a weak solution of approximately 2 mg. succinylcholine dichloride per 1 cc. water and for intramuscular and intraperitoneal injection, a solution of approximately 20–50 mg./cc. Succinylcholine dichloride aqueous solutions are available commercially under the brand names "Sucostrin" and "Anectine."

TABLE I

| | Dosage in mg./kg. weight of animals |
|---|---|
| Sheep: | |
| Intravenous needle injection | 0.03 |
| Intraperitoneal needle injection | 0.48 |
| Intramuscular hypospray | 0.50 |
| Intramuscular needle injection | 0.30 |
| Local absorption (in eye) | (1) |
| Cattle and calves: | |
| Intravenous needle injection | 0.02 |
| Intramuscular injection (jet spray) | 0.2 |
| Intramuscular injection (needle) | 0.15 |
| Hogs: | |
| Intravenous needle injection | 0.05 |
| Intramuscular needle injection | 0.50 |

[1] 5 or 6 sprays from an atomizer per conjunctiva of 100 mg./cc. succinylcholine solution.

As previously mentioned, these dosages can be varied somewhat depending on a number of factors.

If hyaluronidase is employed with succinylcholine dichloride for its spreading effect, it is recommended that at least 3 TRU (turbidity reducing units) per cc. of succinylcholine dichloride (irrespective of concentration thereof) be used. It is further recommended that no more than 150 TRU of hyaluronidase be added per injection site.

After injection with a muscle relaxant drug the animal will go down in sternal recumbency, with substantially no prior movement, usually with sufficient tonus in the neck muscles to present an animal in the horizontal position with its legs substantially under it or out to the sides and with its head up. This position is much more adaptable to further operations (which may include shackling, injection of enzyme, stunning, heart bleeding, etc.) than would be the case if the animal were lying on its side. Clearly only minimal restraining of the animal is required prior to injection of the muscle relaxant, and substantially none is required thereafter if the animal is insensibilized and/or bled prior to recovery from the effect of the drug.

A particularly advantageous embodiment of my method involves a slaughtering system wherein animals are driven into a chute which need not be substantially wider than the width of the animals. The chute can be, but need not be, at ground level near the holding pens, to minimize driving time, animal bruising, labor, etc. The floor of this chute consists of a conveyor belt. If, for example, ten animals are included in the drive, they are moved into the chute and an operator, who may be on an elevated platform at the side of the chute, reaches over and administers succinylcholine dichloride to each animal in a dose effective to immobilize the animal. The drug is very effectively administered by intramuscular injection in the perineal area, although other sites or multiple sites may be used. Injection is preferably preceded by cleansing of the site. Preparation and injection takes about 5–6 seconds per animal and thus one operator can inject ten animals in approximately one minute. After the animals go down in sternal recumbency, the gate, or other barrier at the front of the chute, is removed and the conveyor activated. Depending on the dosage administered, the animals will remain immobilized in that position for 2–20 minutes and are adaptable to be transported to various stations automatically and substantially continuously for carrying out other operations.

For example, the immobilized animals can be moved directly by conveyor to the dressing floor where they can be bled or first rendered insensible by means of stunning or anesthetic agents and subsequently bled. A decided advantage is realized when the animal is substantially completely relaxed prior to stunning and/or bleeding. Two or more conveyors can be utilized to facilitate a steady flow of animals from the chute past the various stations (if desired) and to the bleeding station in the dressing area. If it is desired to inject enzyme or other materials into the animals this can very effectively be accomplished any time after immobilization with the muscle relaxant and during the time that sufficient circulatory action remains in the animal to substantially uniformly distribute the enzyme solution in the capillary network. When the solution is being administered over the period of time, it is recommended that the enzyme or other solution be in the vascular system of the animal for at least one-half the time required for one complete circuit of blood through the animal's circulatory system. The time for one complete circuit of blood through the circulatory system of animals will generally be within the range of 45–90 seconds. If the chemically immobilized animal is to be stunned or otherwise rendered unconscious before killing, it is preferable, but not required, that enzyme injection be prior to such forms of insensibilizing since this preferred sequence of steps will avoid problems of insufficient heart action or insufficient time for enzyme distribution prior to necessity to bleed the animal. Of course, if the muscle relaxant administered will remain effective even if the animal revives from the insensibilizing treatment, this sequence becomes less important.

It is thus apparent that immobilization of the animals by means of a muscle relaxant, and preferably succinylcholine, is exceptionally suitable as a means of chemically restraining animals prior to enzyme injection since it provides ample time for injection and distribution of an enzyme or other solution and does not adversely affect heart action. Inasmuch as reflex movement as well as voluntary movement of the animals is substantially inhibited, there is no danger of animal movement causing an operator to improperly insert the enzyme injection equipment with the attendant possibility of equipment damage, loss of enzyme, injury to animal or operator, and poorly processed product.

As previously mentioned, if it is desired, hypnotics, sedatives, analgesics, and anesthetics can be combined with the muscle relaxant drug prior to its administration to the animal or can be administered prior to or after the muscle relaxant. Proper dosages of these materials are known in the art. Hypnotics are drugs used to moderately depress the central nervous system of animals, thereby making them less responsive to stimuli. In small doses, many hypnotic drugs exert a mild sedative action. A sedative may be used to quiet an animal that is excited by a change in its surroundings or by some unfamiliar procedure. Except for the opiates, hypnotics do not relieve pain but they dull the conscious perception of pain. Most hypnotics have little effect upon the circulation, respiration or metabolism when given in proper dosages. Analgesics are drugs used for the relief of mild and nonspecific pain. Barbital sodium, phenobarbital sodium, secobarbital sodium, and chloral hydrate are examples of materials that produce a hypnotic and sedative effect. In addition, chloral hydrate is a weak analgesic. Opium alkaloids, including morphine, its derivatives and substitutes, are primarily analgesic in function, although morphine itself exerts a sedative and hypnotic effect as well. Examples of the derivatives include codein phosphate and dihydromorphinone; examples of the substitutes include meperidine hydrochloride and methadone hydrochloride. Illustrative examples of other hypnotics and sedatives employed include chlorpromazine hydrochloride, rauwolfia alkaloids, sodium bromide, chlorbutanol, paraldehyde and urethane. Examples of other useful analgesics include acetanilid, acetophenetidin, aminopyrine, salicyclic acid, sodium salicylate, and acetylsalicyclic acid. Examples of injectable anesthetics include the barbiturates, such as amobarbital sodium, hexobarbital sodium, pentabarbital sodium, thiopental sodium, thialbarbitone sodium, and thiamylal, and other depressants, such as chloral hydrate, magnesium sulfate, a mixutre of chloral hydrate and magnesium sulfate (with or without pentobarbital sodium) and beta-naphthoxyethanol with thialbarbitone sodium. To the extent that administration of the above types of materials calm the animal and reduce pain (or at least its perception) animal treatment can be considered more humane when they are used.

The following examples are illustrative only and are not to be construed as limiting the scope of my invention:

EXAMPLE I

A 148 pound sheep was given an intravenous injection of succinylcholine dichloride in the amount of 0.04 mg./kg. body weight. In 1½ minutes the animal was down, without substantial previous movement. The dosage was effective for 3 minutes, after which the animal got up.

EXAMPLE II 0.5 mg./kg. succinylcholine dichloride in the form of a 50 mg./cc. aqueous solution was injected intramuscularly into a 131 pound sheep by means of a hypospray device manufactured by R. P. Scherer Corp., Inc., Detroit, Mich. In 12 minutes the animal was down and remained down for 20 minutes. It was noted that the hemorrhage in the muscle sometimes occurring after needle injection did not occur using the hypospray device. Following injection of the muscle relaxant the animal received a 60 mg./pound injection of papain enzyme solution into the vascular system. The animal was subsequently dispatched and dressed.

EXAMPLE III

A 145 pound sheep was intramuscularly injected, by needle, with 0.3 mg./kg. succinylcholine dichloride. In 9 minutes 40 seconds the animal was immobile in a position of sternal recumbency with its head up. Two minutes later the animal was injected with 60 mg. papain solution per kg. body weight. Thirteen and one-half minutes thereafter the animal was on its feet and was subsequently dispatched and dressed. Thereafter cooking and eating quality of meat from this animal was tested. Leg roasts were placed fat side up on racks in shallow roasting pans in 325° F. ovens and cooked from an internal temperature of 42° F. to 180° F. Loin chops were broiled to 180° F. The cooked meat was evaluated for tenderness and texture on an arbitrary scale ranging from 1–10 as follows:

| | |
|---|---|
| 10 | Excellent. |
| 7–9 | Good. |
| 4–6 | Fair. |
| 3 | Poor. |
| 2 | Very Poor. |
| 1 | Unsatisfactory. |

The ratings were as follows:

| | Tenderness | Texture |
|---|---|---|
| Roasts | 8.3 | 10.0 |
| Chops | 7.0 | 10.0 |

EXAMPLE IV

Three mutton animals of the same approximate quality and weight were treated as follows and cooking and eating quality evaluated after the same preparation and on the same scale set forth in Example III.

The first animal was intramuscularly injected, by needle, with .35 mg./kg. succinylcholine dichloride. In 6½ minutes the animal was immobilized in a position of sternal recumbency. Prior to regaining muscular control the animal was dispatched, bled, and dressed.

The second animal received a similar injection of succinylcholine dichloride. About three minutes after immobilization 60 mg. papain in aqueous solution per pound live weight was injected into the vascular system of the animal. Ten minutes thereafter (and before the animal recovered from the effect of the succinylcholine dichloride) the animal was bled and dressed in the conventional manner. The injection of succinylcholine dichloride in these two anmials was at a concentration of 20 mg./cc.

The third animal was mechanically restrained and injected with 60 mg. papain per pound live weight of an aqueous solution of high enzyme activity. The animal was dispatched approximately ten minutes after enzyme injection. The dosage of enzyme is somewhat higher than would normally be employed.

The following table shows the tenderness and texture data on cooked meat from these three animals:

TABLE II

| Animal tested | Tenderness | Texture |
|---|---|---|
| Succinylcholine dichloride alone: | | |
| Roast | 6.3 | 10.0 |
| Chops | 8.5 | 10.0 |
| Succinylcholine dichloride plus papain: | | |
| Roast | 9.7 | 9.3 |
| Chops | 9.0 | 10.0 |
| Papain alone: | | |
| Roast | 10.0 | [1] 3.3 |
| Chops | 10.0 | 9.0 |

[1] Not carveable.

The above data shows the satisfactory quality of meat treated with enzyme after administartion of a muscle relaxant drug. It should be noted that the texture of the meat in animals treated with succinylcholine dichloride is improved over that treated with enzyme alone.

EXAMPLE V

A 60 kg. sheep was intramuscularly injected by hypospray with 60 mg. of succinylcholine dichloride. The animal was down quietly in sternal recumbency with its head up in four minutes. Two minutes later injection was repeated in the amount of 50 mg. (1 cc. of 50 mg./cc. solution). One minute after the second injection loss of tonus in the neck muscles was evident and the animal's head drooped. After one more minute shallow breathing was noted and 10 minutes later a third injection of 50 mg. was given. Six minutes thereafter the animal had lost any palpebral reflex. Thereafter, the animal was stuck and bled. Substantially no agonal struggling or other movement was noted.

EXAMPLE VI

A 180 pound hog was needle-injected, intramuscularly, with 0.5 mg. succinylcholine dichloride per kg. body weight. The animal was quiet, appeared drowsy and in 10½ minutes was down in sternal recumbency, having lost substantially all voluntary skeletal muscle action. The animal exhibited no reflex action of the body.

EXAMPLE VII 0.5 mg./kg. succinylchlorine dichloride was injected by needle into the anterior vena cava of a 190 pound hog. In several minutes the animal was down with its head up. Thereafter the animal, in a substantially relaxed state, was electrically stunned to render it insensible and was dispatched substantially immediately. Substantially no hemorrhage occurred in the animal following electrical stunning.

EXAMPLE VIII

A beef animal was injected intramuscularly with 0.2 mg./kg. succinylcholine dichloride. About 2 minutes after injection the animal's legs "folded up" and he fell, slowly, to a horizontal position, without hitting his head on the floor. Despite complete paralysis of the extremities, some tonus of the neck muscles remained so that the animal was in a good position to be electrically stunned. About 2 minutes thereafter, while the animal was still under the effect of the muscle relaxant, an electrical stunning device was applied to its head and delivered 220 volts of electricity to the animal for 1 second. The animal did not exhibit the usual violent revival from the electric shock, but remained substantially unexcited and quiet. Thereafter the animal was dispatched.

EXAMPLE IX

A 104 pound sheep was given intramuscular injection of "Sucostrin," 20 mg./cc. concentration, at a dosage of 1.2 mg. succinylcholine dichloride per kg. body weight. The dose was divided into aliquot portions and injected at three different sites. The total solution injected was 31 ml. Injection commenced at 11:05:55 and the animal was down at 11:10:10. At 11:11:40, 0.3 ml. papain solution per pound live weight was injected intravenously. The animal was electrically stunned at 11:12:30 by delivering 220 volts of electricity to the head of the animal for 3 seconds. The animal was stuck at 11:30:10 and dressed.

Subsequently cooking and eating quality of the above animal was evaluated on the same scale and after substantially the same preparation as that set forth in Example II. The results were as follows:

|  | Tenderness | Texture |
| --- | --- | --- |
| Roasts | 9.5 | 10.0 |
| Chops | 9.3 | 10.0 |

EXAMPLE X

In this example 1 cc. of hyaluronidase (150 TRU's) was added to a 50 mg./cc. concentration "Sucostrin" solution. The mixture was divided into three equal portions and injected intramuscularly at three sites into a 130 pound sheep. The dosage of the succinylcholine dichloride was 1.2 mg./kg. body weight. Injection of the above mixture took 30 seconds and was completed at 11:33:30. At 11:35:15 the animal was down, without movement, and at 11:37:10 intravenous injection of 0.3 ml. papain solution per pound live weight was commenced. Two minutes after commencement of enzyme injection the animal was electrically stunned (220 volts, 3 seconds). Fifty seconds thereafter (at 11:40) the animal was stuck. The animal's heart stopped beating at 11:42. No restraint was necessary for electrical stunning. The heart-beat was strong after stunning and continued for two minutes after sticking, allowing ample time for enzyme distribution.

Cooking and eating quality ratings of this animal were as follows:

|  | Tenderness | Texture |
| --- | --- | --- |
| Roasts | 10.0 | 9.0 |
| Chops | 10.0 | 10.0 |

EXAMPLE XI

A 182 pound sheep was given intravenous injection of 20 mg./cc. "Sucostrin" solution at a dosage of 0.4 mg./kg., or about 1.6 cc. "Sucostrin" The animal was injected at 9:41:30 and after 10 seconds was down and motionless. At 9:42:30 the animal had lost its respiratory ability. Its heart stopped at approximately 9:47. Agonal contraction was limited to feeble openings of the mouth.

EXAMPLE XII

Tubocurarine chloride in a concentration of 20 units (3 mg.) per cc. solution was used as the muscle relaxant in this case. This solution was further diluted to the extent of 1 cc. of the 20 unit/cc. solution to 4 cc. of saline solution. Therefore, injection concentration was 4 units/cc. solution. A 84.1 kg. sheep was injected with .25 unit tubocurarine chloride per kg. body weight. Injection was commenced at 9:57:45. At 9:58:50 the animal was down and motionless. At 10:00 papain solution was continuously injected intraveneously until 0.10 ml. papain solution per pound live weight, or 19 ml., had been injected. The animal was stuck at 10:01. As a control a 150 pound sheep was mechanically immobilized and injected intravenously with 0.10 ml. papain solution per pound live weight. The control animal was stuck one minute after enzyme injection.

Cooking and eating quality ratings of these animals were as follows:

| Control | Tenderness | Texture |
| --- | --- | --- |
| Roasts | 5.0 | 9.0 |
| Chops | 8.0 | 9.0 |
| Tubocurarine injected: |  |  |
| Roasts | 6.0 | 10.0 |
| Chops | 8.0 | 10.0 |

Obviously, many modifications and variations of the invention as hereinbefore set forth may be made without departing from the spirit and scope thereof, and therefore only such limitations should be imposed as are indicated in the appended claims.

I claim:

1. An improved method of slaughtering an animal which comprises injecting a sufficient amount of succinylcholine dichloride into said animal to cause said animal to be immobilized in a horizontal position in not more than about 15 minutes, and bleeding said animal before it regains the power of movement.

2. The method of slaughtering an animal which comprises: administering to said animal a sufficient amount of a muscle relaxant drug to substantially inhibit voluntary and reflex movement of the skeletal muscles of said animal, injecting a proteolytic enzyme solution into the vascular system of said animal, and thereafter draining the blood from said animal.

3. The method of slaughtering an animal which comprises: injecting into said animal a sufficient amount of succinylcholine dichloride to substantially inhibit voluntary and reflex movement of the skeletal muscles of said animal, while said movement is inhibited injecting a papain solution into the vascular system of said animal, and thereafter draining the blood from said animal.

4. The method of slaughtering an animal which comprises: injecting a small amount of succinylcholine dichloride into said animal, said amount being sufficient to substantially inhibit voluntary and reflex movement of the skeletal muscles of said animal whereby the animal will be immobilized; thereafter injecting a proteolytic enzyme solution into the vascular system of said animal; rendering said animal unconscious; and draining the blood from said animal.

5. The method of claim 4 wherein the animal is rendered unconscious by means of electrical stunning.

6. The method of slaughtering an animal which comprises: administering to said animal a sufficient amount of a muscle relaxant drug to substantially inhibit voluntary and reflex movement of the skeletal muscles of said animal, rendering said animal unconscious by stunning, injecting a proteolytic enzyme solution into the vascular system of said animal and thereafter draining the blood from said animal.

7. A method of slaughtering an animal comprising the steps of injecting said animal with a water solution of succinylcholine chloride containing from 2 mgs. to 5 mgs. per hundred pounds of body weight of the animal to be slaughtered, waiting for a period of from 3 minutes to 20 minutes until said animal becomes paralyzed, and then slaughtering the animal while still alive but in a paralyzed state.

8. A method of slaughtering an animal comprising the steps of injecting said animal with a solution of a succinylcholine halide containing a sufficient quantity to paralyze the animal to be slaughtered, waiting until said animal becomes paralyzed, and then slaughtering the animal while still alive but in a paralyzed state.

9. A method of slaughtering an animal comprising the step of injecting said animal with a water solution of succinylcholine halide containing from 2 mgs. to 5 mgs. per hundred pounds of body weight of the animal to be slaughtered, waiting for a period of from three minutes to twenty minutes until said animal becomes paralyzed, and then slaughtering the animal while still alive but in a paralyzed state.

10. In the method of slaughtering animals wherein they are rendered unconscious prior to bleeding, the improvement which comprises: administering to said animals an amount of a muscle relaxant drug sufficient to substantially inhibit voluntary and reflex movement of the skeletal muscles of said animals prior to rendering them unconscious, rendering the animal unconscious and bleeding the animal before it regains the power of movement.

11. The method of claim 10 wherein the muscle relaxant drug is succinylcholine chloride.

References Cited

UNITED STATES PATENTS

| | | |
|---|---|---|
| 81,185 | 8/1868 | Lugo. |
| 231,807 | 8/1880 | Jones. |
| 1,857,658 | 5/1932 | Pfretzschner. |
| 2,895,164 | 7/1959 | Murphy _____ 17—45 |
| 2,903,362 | 9/1959 | Beuk et al. _____ 99—107 |
| 2,977,627 | 4/1961 | Morse al. |

OTHER REFERENCES

"A Manual of Pharmacology and Its Applications to Therapeutics and Toxicology," 8th edition, 1957, by T. Sollmann, published by W. B. Saunders Company, Philadelphia, Pa., pp. 422 and 423, article entitled Succinylcholine.

LUCIE H. LAUDENSLAGER, Primary Examiner

U.S. Cl. X.R.

17—1, 45